C. R. MURRAY, L. R. BRINK & W. K. MALMSTROM.
APPARATUS FOR ELECTRIC WELDING.
APPLICATION FILED APR. 15, 1912.
1,063,999.
Patented June 10, 1913.
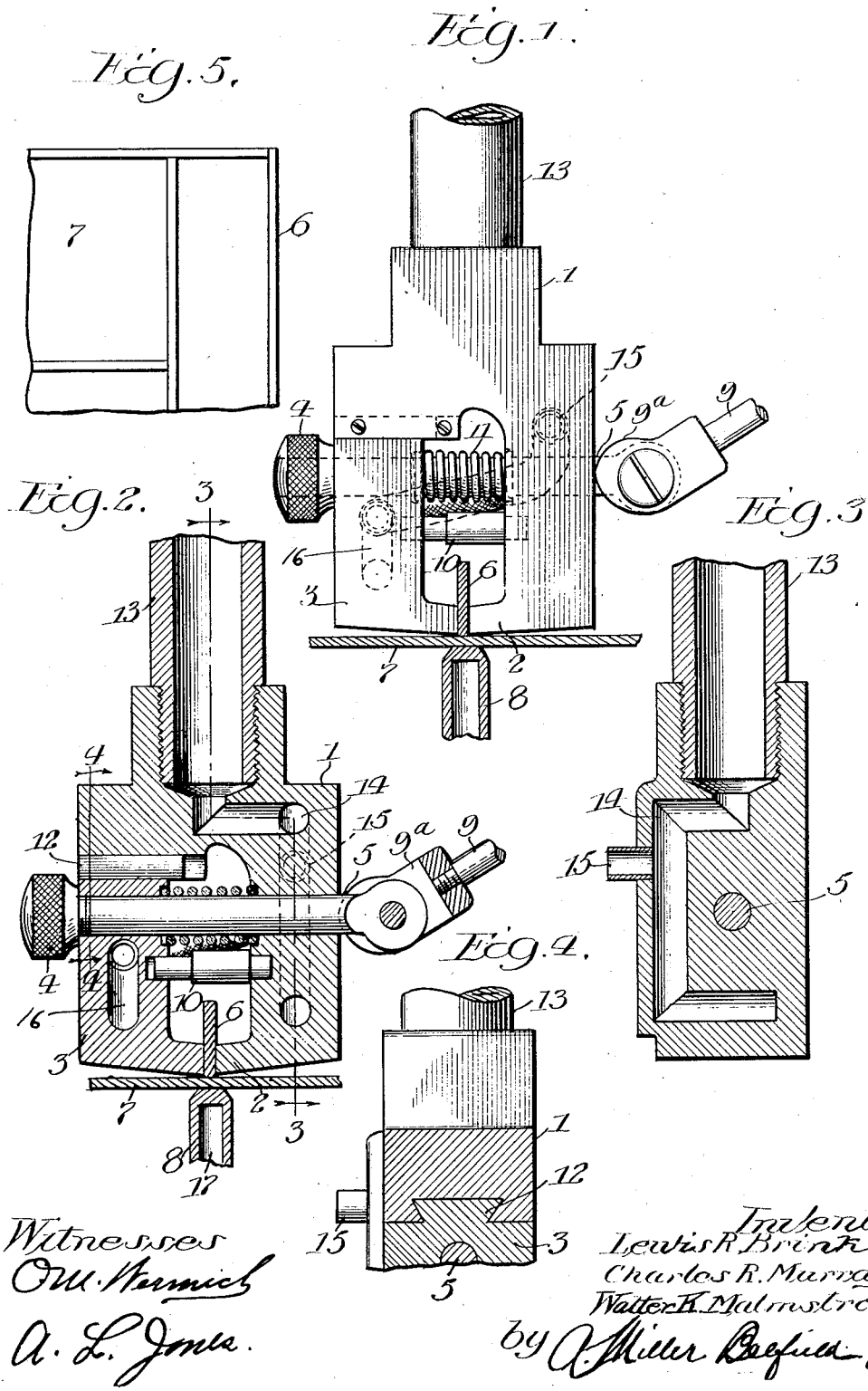

UNITED STATES PATENT OFFICE.

CHARLES R. MURRAY, LEWIS R. BRINK, AND WALTER K. MALMSTROM, OF CHICAGO, ILLINOIS, ASSIGNORS TO BARNHART BROS. & SPINDLER, OF CHICAGO, ILLINOIS, A CORPORATION OF ILLINOIS.

APPARATUS FOR ELECTRIC WELDING.

1,063,999. Specification of Letters Patent. Patented June 10, 1913.

Application filed April 15, 1912. Serial No. 691,018.

*To all whom it may concern:*

Be it known that we, CHARLES R. MURRAY, LEWIS R. BRINK, and WALTER K. MALMSTROM, citizens of the United States, residing at Chicago, in the county of Cook and State of Illinois, have invented a certain new and useful Improvement in Apparatus for Electric Welding, of which the following is a full, clear, concise, and exact description, reference being had to the accompanying drawings, forming a part of this specification.

Our invention relates to apparatus for electric welding and has as its principal object the provision of means whereby a metal surface may be welded directly to another of different cross section.

A further object of our invention resides in the particular arrangement and combination of parts hereinafter described. As is well known by those engaged in the art of electric welding it has heretofore been thought impossible to weld together two pieces of different cross section. By repeated experiments, however we have succeeded in developing apparatus by which this result can be accomplished.

In the accompanying drawings Figure 1 is an elevational view of our improved apparatus shown in position for operation upon two pieces of metal; Fig. 2 is a vertical central section of Fig. 1; Fig. 3 is a sectional view on the line 3—3 of Fig. 2, looking in the direction of the arrows; Fig. 4 is a sectional view on the line 4—4 of Fig. 3, showing more particularly the dove tail connection between certain parts of the apparatus; Fig. 5 is a fragmentary plan view of an article made by our apparatus.

Referring more particularly to the drawings, 1 is a die or clamp having a fixed jaw 2 integral therewith, and a movable jaw 3 having a sliding dove tail engagement therewith. As shown, the die 1, is cut or hollowed out so that the jaws 2 and 3 are narrow in a vertical direction, giving narrow contact faces and thus enabling the jaws to clamp a strip to be welded along one edge only so as to localize the current lines in the strip and sheet.

5 is a bolt by which the jaws 2 and 3 may be firmly pressed together to clamp a metal strip such as 6, which it is intended to weld to a sheet of metal such as 7. As shown, the strip 6 will be pressed down on the upper surface of the sheet 7, while the die or electrode 8 is firmly pressed against the under surface of the sheet 7 so that the surface of the sheet may be welded to the edge of the strip. As clearly shown in Figs. 1 and 2 the die 8 is cylindrical and is reduced at its top so as to present a small area of contact to the sheet 7 the contact surface being flat. It will be obvious, however, that a small contact area between the die and sheet might be obtained in other ways.

9 is a lever or handle having pivoted connection with the bolt 5 and having a cam surface 9ª which bears against the outer surface of the die 1 in order to draw the two jaws of the die firmly together. A pin 10 is provided which prevents the jaws from being brought too closely together, while a spring 11 serves to separate the jaws when the lever 9 is operated to release the cam surface 9ª from engagement with the jaw 2. As best shown in Fig. 4 the jaw 3 is provided with a dove tailed projection 12 which slides in a socket in the body of the die 1. As is plainly indicated in the drawings the dies are both designed to be water cooled. The die 1 is supported by a hollow rod 13 and is provided with a duct 14 connecting directly with the interior of said hollow rod. A pipe or tube 15 leads from the duct 14 to a duct 16 in the jaw 3. The die 8 is provided with a duct 17. As will be apparent to those skilled in the art our improved dies as shown can be used in any standard electric welding machine.

It will be further understood that the standard welding machines are provided with means for forcing together the dies employed in the machine. It will also be apparent to those skilled in the art that the width or height of the strip to be welded to the side of a metal sheet is immaterial since the jaws of our clamping die grasp the strip at the edge which is to be welded to the sheet. Special dies may be made to accommodate strips of greater width or height than those shown in the drawings.

Referring to Fig. 5, 7 indicates a sheet such as the one which is shown in the dies when used as the base or bottom plate of an article as made by our apparatus, the surface of the plate being divided into compartments by strips of metal such as 6 standing at right angles thereto. Such articles are of use for various purposes and we find them particularly useful as type cases.

In the operation of our apparatus a strip such as 6 is placed between the jaws 2 and 3 and firmly clamped therein, so that the jaws will be at the lower edge of the strip. A sheet such as 7 is then placed on top of the die 8 and the two dies are pressed firmly together, whereupon the current is turned on. Owing to the particular design of our apparatus the surface of the sheet is brought to a welding temperature at the same time as is the edge of the strip. Consequently a firm weld results. When a weld has been made between a strip and sheet in one spot, the pieces being worked on are then moved and the same strip welded to the face of the plate in another spot. In making these welds it is not necessary to form projections of any kind on the face of the plate, or roughen, or indent it in any way.

It will be understood that while we have shown and described the preferred form of our invention, various modifications and rearrangements thereof may be made and that we contemplate all such rearrangements as are electrically and mechanically equivalent to our device.

Having thus described our invention, what we claim is:

1. In a device of the class described in combination, a lower electrode provided with a small bearing surface, a die having means for firmly clamping material therein, and means for forcing said die toward said electrode.

2. A welding die comprising an integral fixed jaw, a movable jaw having sliding engagement with said fixed jaw, each of said jaws being provided with water ducts, a tube connecting the ducts in the two jaws, means for pressing said jaws together, and a pin for guiding said movable jaw.

3. In a device of the class described in combination, an electrode, a clamping die and means for forcing said die toward said electrode, said electrode having a smooth exterior surface.

4. A molding die comprising in combination vertically disposed portions having their lower ends provided with projections extending toward one another to form narrow meeting faces, a bolt passing through said vertical portions and having one end provided with screw threads and a threaded head thereon, and having the other end provided with a pivotally mounted cam lever having a cam arranged to act against the outer side of the adjacent vertical portion, a pin extended between the vertical portions of the die said vertical portions being provided with horizontal apertures for said pin, and an electric terminal connected to said vertical portions.

5. In a device of the class described in combination, an integral electrode, a clamping die having its clamping faces lying substantially at right angles to the working face of said integral electrode, and means for moving said clamping die in a direction parallel to its clamping faces.

6. In a device of the class described in combination, an electrode provided with a flat working surface, a clamping die provided with jaws having opposed flat clamping surfaces lying in planes perpendicular to said first mentioned surface, and means for moving said clamping die in a direction parallel to its clamping surfaces.

7. An electric welding apparatus comprising in combination, opposed clamping jaws having narrow contact faces, and an electrode lying in the plane which is central between said faces.

8. An electric welding apparatus comprising in combination, a die having two opposed jaws, said jaws projecting toward each other at one end forming relatively narrow contact faces, an electrode arranged opposite the meeting line of said faces, means for forcing said jaws toward each other and means for forcing said jaws toward said electrode.

9. An electric welding apparatus comprising in combination, a welding die having two opposed jaws, the central portion of said jaws being cut away leaving narrow contact faces at one end of said jaws, an electrode opposite said die, and means for forcing said die toward said electrode.

10. An electric welding apparatus comprising in combination, a welding die having two opposed clamping jaws provided with narrow contact faces, an electrode of small area lying in the plane midway between said contact faces, and means for pressing said die and electrode toward each other.

In witness whereof, we hereunto subscribe our names this 27th day of March, A. D., 1912.

CHAS. R. MURRAY.
LEWIS R. BRINK.
WALTER K. MALMSTROM.

Witnesses:
A. L. JONES,
A. S. DENNISON.